US012251711B2

(12) United States Patent
Krogh

(10) Patent No.: US 12,251,711 B2
(45) Date of Patent: Mar. 18, 2025

(54) FERROMAGNETIC MATERIAL REMOVING DEVICE AND METHOD FOR REMOVING FERROMAGNETIC MATERIAL FROM A FLUID

(71) Applicant: RIGTOOLS ApS, Randers (DK)

(72) Inventor: Per Krogh, Randers (DK)

(73) Assignee: RIGTOOLS ApS, Randers SØ (DK)

( * ) Notice: Subject to any disclaimer, the term of this patent is extended or adjusted under 35 U.S.C. 154(b) by 0 days.

(21) Appl. No.: 18/627,210

(22) Filed: Apr. 4, 2024

(65) Prior Publication Data

US 2024/0246091 A1 Jul. 25, 2024

Related U.S. Application Data

(63) Continuation of application No. PCT/DK2022/050175, filed on Aug. 29, 2022.

(30) Foreign Application Priority Data

Oct. 9, 2021 (DK) .......................... PA 2021 00966

(51) Int. Cl.
*B03C 1/14* (2006.01)
*B03C 1/029* (2006.01)
*E21B 21/06* (2006.01)

(52) U.S. Cl.
CPC .............. *B03C 1/029* (2013.01); *B03C 1/145* (2013.01); *E21B 21/065* (2013.01); *B03C 2201/18* (2013.01); *B03C 2201/22* (2013.01)

(58) Field of Classification Search
CPC ..... B03C 1/029; B03C 1/145; B03C 2201/18; B03C 2201/22; E21B 21/065
USPC .......................................................... 209/214
See application file for complete search history.

(56) References Cited

U.S. PATENT DOCUMENTS

| | | | | |
|---|---|---|---|---|
| 4,451,360 | A * | 5/1984 | Salmi | B03C 1/02 209/225 |
| 5,496,470 | A | 3/1996 | Lenhart | |
| 2005/0045542 | A1 | 3/2005 | Hobson | |
| 2011/0186523 | A1 | 8/2011 | Williamson et al. | |
| 2013/0105199 | A1* | 5/2013 | Domesle | F03D 13/20 174/138 R |
| 2020/0171511 | A1 | 6/2020 | Nishizawa | |
| 2021/0237098 | A1 | 8/2021 | Seidelson et al. | |

(Continued)

FOREIGN PATENT DOCUMENTS

| | | | |
|---|---|---|---|
| BR | 102020023390 | A2 | 3/2021 |
| CA | 2639885 | A1 | 4/2009 |
| CN | 201295638 | Y * | 8/2009 |

(Continued)

*Primary Examiner* — Terrell H Matthews
(74) *Attorney, Agent, or Firm* — Elevated IP, LLC

(57) ABSTRACT

A ferromagnetic material removing device for removing ferromagnetic material from a fluid containing ferromagnetic material is disclosed. The device comprises at least one carrier encasing a plurality of permanent magnets arranged in an inner space of the carrier. The outside of the carrier is configured to collect ferromagnetic material that is attracted by the magnets. The carrier is ring-shaped and rotatably mounted and the device comprises a removing portion arranged and configured to remove the ferromagnetic material from the outside of the carrier and a driving assembly arranged to rotate the carrier.

15 Claims, 8 Drawing Sheets

(56) References Cited

U.S. PATENT DOCUMENTS

2024/0024894 A1* 1/2024 Souza ..................... B03C 1/032

FOREIGN PATENT DOCUMENTS

| | | | | | |
|---|---|---|---|---|---|
| CN | 201659025 U | * | 12/2010 | | |
| CN | 202497931 U | | 10/2012 | | |
| CN | 103785528 A | * | 5/2014 | ............... | B03C 1/02 |
| CN | 113477396 A | | 10/2021 | | |
| EP | 1786080 A1 | * | 5/2007 | ............. | F03D 80/85 |
| EP | 2518844 A1 | * | 10/2012 | ............. | H02G 1/081 |
| EP | 2604347 A1 | * | 6/2013 | ............... | B03C 1/14 |
| GB | 2064377 B | * | 3/1984 | ............. | B03C 1/035 |
| JP | 2012239989 A | | 12/2012 | | |
| KR | 20150004555 U | | 12/2015 | | |

* cited by examiner

Fig. 7A
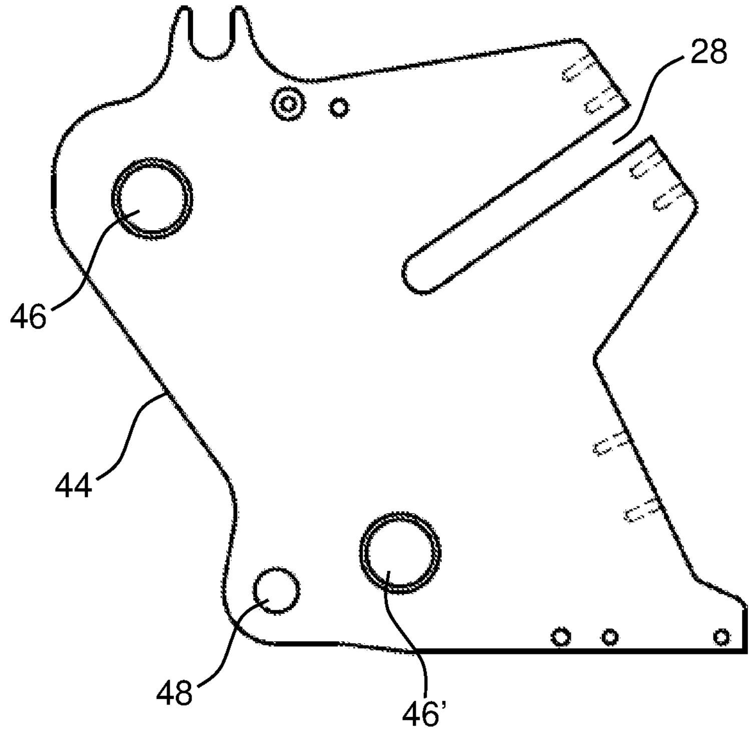
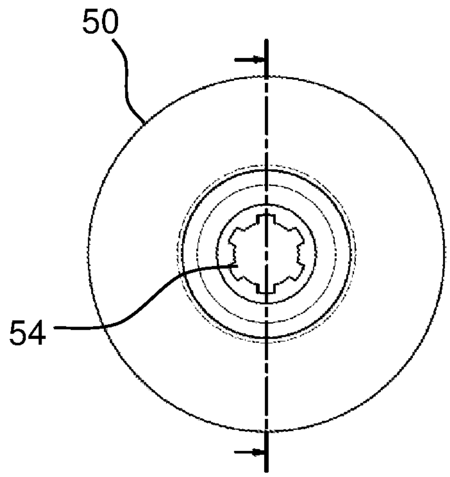
Fig. 7B
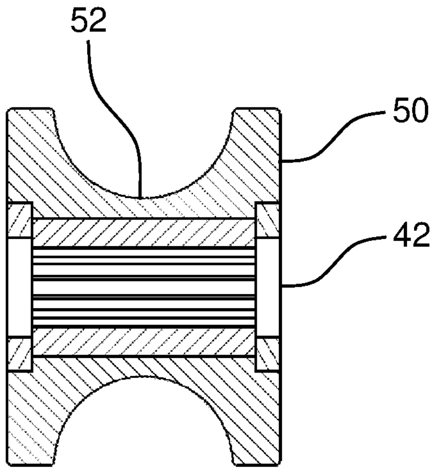
Fig. 7C

Fig. 8A
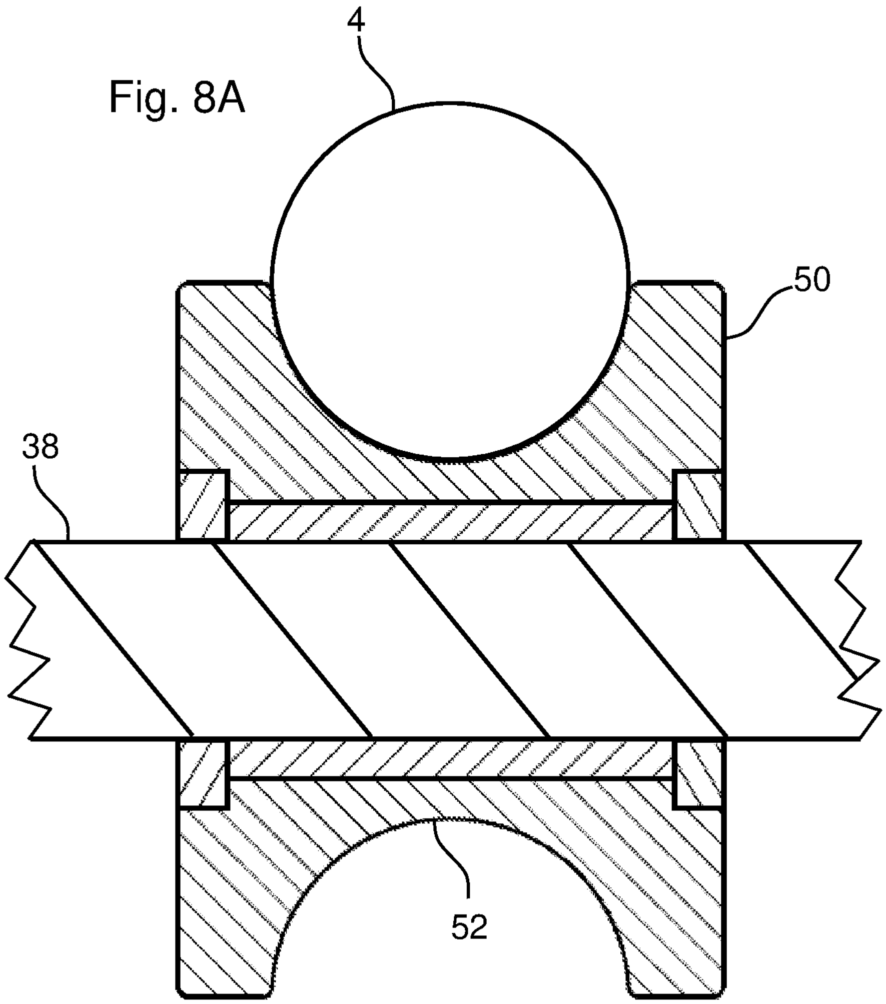
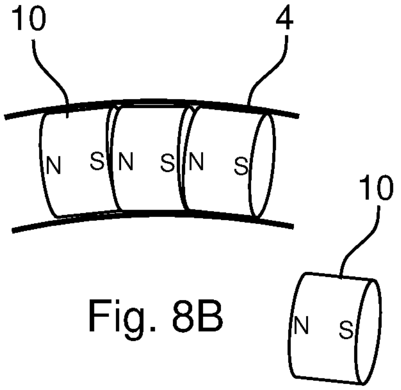
Fig. 8B
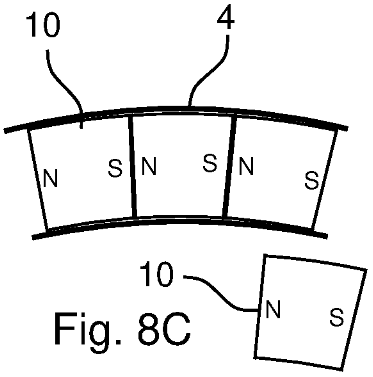
Fig. 8C

FERROMAGNETIC MATERIAL REMOVING DEVICE AND METHOD FOR REMOVING FERROMAGNETIC MATERIAL FROM A FLUID

CROSS-REFERENCE TO RELATED APPLICATIONS

This application is a continuation under 35 U.S.C. 111 of International Patent Application No. PCT/DK2022/050175, filed Aug. 29, 2022, which claims the benefit of and priority to Danish Application No. PA 2021 00966, filed Oct. 9, 2021, each of which is hereby incorporated by reference in its entirety.

FIELD OF INVENTION

The present invention relates to a ferromagnetic material removing device and a method for removing ferromagnetic material from a fluid.

BACKGROUND

Drilling fluid, also called drilling mud, is a viscous fluid mixture that is used in oil and gas drilling operations. Drilling fluid is applied to carry rock cuttings to the surface, to lubricate and cool the drill bit and furthermore to control the wellbore pressure in order to avoid blowouts. Drilling fluids can either be based on water or be oil-based. During the drilling process, ferromagnetic material, such as particles of iron or iron oxides, are released.

Ferromagnetic material in the drilling fluid is a major problem because the pumps used to circulate the drilling fluid are worn out rapidly if the ferromagnetic material is not removed from the drilling fluid. Accordingly, an efficient removal of ferromagnetic material from fluids is essential in oil and gas drilling sites.

Some prior solutions use magnetic components arranged in an enclosure that is directly exposed to the fluid. These solutions are manually operated, and removing the accumulated ferromagnetic material is difficult.

US2005045542A1 discloses a skimmer for removing oil and paramagnetic chips from a contaminated body of machine tool coolant. The skimmer includes a frame and an endless tube partially trained within the frame that defines a travel path. The path of the tube includes a first section within the body of coolant and a second section out of the body of coolant. The skimmer further includes a magnet disposed within the tube, a drive system mounted to the frame and operatively coupled to the tube to power travel of the tube, and a wiper connected to the frame at a position along the travel path. The wiper is advantageously positioned adjacent to the tube such that the wiper removes oil and metal chips carried by the tube. A receptacle is included that delineates a collection space positioned below the wiper to receive oil and metal chips. The device, however, takes up a lot of space and has a rather low capacity. Accordingly, it would be advantageous to have a more compact device with a higher capacity.

KR20150004555U discloses a ferromagnetic material removing device comprising a single ring-shaped magnet driven by a magnetic gear. The ring-shaped magnet comprises a ring-shaped round pipe or a ring-shaped square pipe of a stainless material. The ring-shaped pipe comprises two or more powerful magnets. The device comprises an automated device for removing ferromagnetic material from the pipe. The device, however, has a rather low capacity. Accordingly, it would be advantageous to have a device with a higher capacity.

Thus, there is a need for a device and a method which reduces or even eliminates the above-mentioned disadvantages of the prior art.

BRIEF DESCRIPTION

It is an object of the disclosure provides a compact automatic ferromagnetic material removing device for automatically removing ferromagnetic material from a fluid. It is also an object to provide a method for automatically removing ferromagnetic material from a fluid, wherein the method provides higher capacity than the prior art methods.

A ferromagnetic material removing device according to the present disclosure is a ferromagnetic material removing device for removing ferromagnetic material from a fluid containing ferromagnetic material, wherein the device comprises at least one carrier encasing a plurality of permanent magnets arranged in an inner space of the carrier, wherein the outside of the carrier is configured to collect ferromagnetic material that is attracted by the magnets, wherein the carrier is ring-shaped and rotatably mounted and wherein the device comprises:

a removing portion arranged and configured to remove the ferromagnetic material from the outside of the carrier; and a driving assembly arranged to rotate the carrier, wherein the device comprises several ring-shaped carriers arranged adjacent to each other, wherein each carrier is connected to a corresponding removing portion arranged and configured to remove the ferromagnetic material from the outside of the carrier, wherein the driving assembly comprises one or more adjustment structures arranged and configured to increase the force with which the one or more rotatably mounted engagement members press towards the outside of the carriers, wherein the driving member is provided with a slot, wherein an adjustment structure formed as a screw extends through the slot, wherein the adjustment structure comprises a threaded portion that engages with a corresponding threaded portion in the driving member.

Hereby, it is possible to provide an improved and more efficient automatic ferromagnetic material removing device. Compared with the prior art manually operated apparatuses it is possible to save cost and provide an improved quality (lower concentration of the ferromagnetic material contained in the fluid).

A ferromagnetic material removing device according to the present disclosure makes it possible to avoid that staff are directly exposed to ferromagnetic material. Moreover, handling of heavy manually operated tools is avoided. Accordingly, the device makes it possible to improve the HSE (Health, Safety and Environmental) conditions for the staff.

In an embodiment, a ferromagnetic material removing device is adapted for removing ferromagnetic material from a drilling fluid containing ferromagnetic material.

Each carrier comprises one or more hollow portions, wherein each hollow portion is configured to encase one or more of permanent magnets. Accordingly, the inner space of the carrier may comprise one or more hollow portions.

In an embodiment, the inner space of the carrier comprises a single hollow portion.

The outside of the carrier is configured to collect ferromagnetic material that is attracted by the magnets. In an embodiment, the outside of the carrier is smooth. In an embodiment, the outside of the carrier is provided with a surface treatment in order to provide a desired surface structure.

The carrier is ring-shaped and rotatably mounted. The carrier is constructed as a centerless wheel (also known as an orbital wheel, a hubless wheel or a spokeless wheel).

It may be an advantage that the carrier is made of a dimensionally stable material so that the carrier will maintain its shape.

In an embodiment, the carrier is made of metal. In an embodiment, the carrier is made of steel. In an embodiment, the carrier is made of stainless steel.

The removing portion is arranged and configured to remove the ferromagnetic material from the outside of the carrier. In an embodiment, the removing portion encircles a portion of the carrier, wherein the removing portion has an opening geometry that fits the cross-sectional area of the carrier.

In an embodiment, the removing portion has a circular opening that fits the cross-sectional area of the carrier having a circular cross section.

In an embodiment, the opening of the removing portion is slightly larger than the cross-sectional area of the carrier to allow for tolerances of the carrier.

In an embodiment, the removing portion is arranged in the top section of the device and the carrier is arranged in such a manner that the removing portion encircles the top portion of the carrier. In an embodiment, a drawer is arranged below the removing portion in such a position that during rotation of the carrier, gravity will cause ferromagnetic material attached to the outside of the carrier to fall into the drawer.

The driving assembly is arranged to rotate the carrier. In an embodiment, the driving assembly comprises or is connected to an actuator or motor that is arranged and configured to drive one or more rotatably mounted engagement members of the driving assembly. In an embodiment, the actuator is an electrical actuator. In an embodiment, the motor is an electric motor.

In an embodiment, the carrier comprises two halves that are joined to form a ring-shaped carrier. By having two halves it is possible to manufacture the carrier in a manner in which it is possible to insert permanent magnets into each of the two semicircular halves before joining said halves. The semicircular halves may be joined by any suitable means. In an embodiment, the semicircular halves are joined by welding together two abutting steel portions. In an embodiment, the semicircular halves are joined by using mechanical joining structures such as screws or hose clips.

In an embodiment, the driving assembly comprises one or more rotatably mounted engagement members brought into engagement with the outside of the carrier. Hereby, it is possible to drive the carrier without using a hub. The carrier is hereby driven as a centerless wheel.

In an embodiment, the engagement members are shaped as pulleys and each carrier has a circular cross-section.

In an embodiment, the ferromagnetic material removing device comprises a control unit connected to and configured to control an actuator or a motor that is connected to the one or more engagement members. Hereby, the carrier can be rotated by activating the actuator or the motor by the control unit.

In an embodiment, the control unit is configured to regulate the angular velocity of the carrier by regulating the speed of the motor or actuator.

In an embodiment, the control unit is connected to or comprises a sensor configured to detect the concentration of ferromagnetic material in the fluid. In an embodiment, the sensor is a turbidity sensor. In an embodiment, the control unit is configured to regulate the speed of the motor or actuator based on (in dependency of) the concentration of ferromagnetic material in the fluid. When a large concentration of ferromagnetic material is detected in the fluid, the control unit will ensure that the speed of the motor or actuator is above a first predefined level. When a lower concentration of ferromagnetic material is detected in the fluid, the control unit will ensure that the speed of the motor or actuator is above a second predefined level and below the first predefined level. In an embodiment, the speed of the motor or actuator is regulated in linear dependency of the concentration of ferromagnetic material detected in the fluid.

In an embodiment, the driving assembly comprises two spaced apart rotatably mounted engagement members. Hereby, it is possible to provide an improved driving assembly since the tolerance requirements are less critical in a system that comprises several mounted engagement members than in a system that comprises a single mounted engagement member only.

The system moreover provides greater safety because the carrier can still be operated by the remaining engagement member if one of the engagement members is damaged.

The driving assembly comprises one or more adjustment structures arranged and configured to increase the force with which the one or more rotatably mounted engagement members press towards the outside of the carriers. Hereby, it is possible to ensure that the one or more engagement members push against the carrier with a sufficiently large force even when the engagement member is subjected to wear during use.

In an embodiment, the adjustment structure is spring loaded (a spring is arranged to provide a force towards the screw).

In an embodiment, each carrier comprises a magnet free zone. The magnet free zone will facilitate the process of releasing the ferromagnetic material attached to the outside of the carrier so that said ferromagnetic material can be removed from the removing portion.

In an embodiment, the magnet free zone extends over 5 degrees or more.

In an embodiment, the magnet free zone extends over 10 degrees or more.

In an embodiment, the magnet free zone extends over 15 degrees or more.

In an embodiment, the magnet free zone extends over 20 degrees or more.

In an embodiment, the magnet free zone extends over 25 degrees or more.

In an embodiment, the driving assembly comprises an electromagnet arranged and configured to generate an alternating magnetic field that causes the carrier to rotate. In an embodiment, the electromagnet is designed as a stator arranged and configured to provide a magnetic field that drives the rotating carrier.

In an embodiment, the device comprises a drawer arranged and configured to collect ferromagnetic material being removed from the outside of the carriers by the removing portions. Hereby, the ferromagnetic material that no longer is attached to the carrier will be collected by the drawer. In an embodiment, the drawer is configured to be emptied by moving the drawer and turning it upside down to empty the drawer into a trash collection unit.

In an embodiment, the drawer comprises a weighing device for weighing the collected ferromagnetic material. Hereby, it is possible to monitor the degree of wear of the structures.

In an embodiment, the device comprises several carriers arranged adjacent to each other. Hereby, it is possible to remove ferromagnetic material from a larger volume. The device can be scaled to meet the actual requirements.

In an embodiment, the device comprises a frame configured to provide a support and/or mounting structure for the driving assembly. The frame is usually provided with mounting structures (holes or bolts) for attaching the frame to corresponding structures (e.g. of a guiding structure, through which the fluid is flowing).

A method according to the present disclosure is a method for removing ferromagnetic material from a fluid containing ferromagnetic material, wherein the method comprises the following steps:

- submerging a carrier into the fluid, wherein said carrier encases a plurality of permanent magnets arranged in an inner space of the carrier, wherein the outside of the carrier is configured to collect ferromagnetic material that is attracted by the permanent magnets,
- releasing the ferromagnetic material from the outside of the carrier, wherein the carrier is ring-shaped and rotatably mounted and wherein the method comprises the step of releasing the ferromagnetic material by using a removing portion arranged and configured to remove the ferromagnetic material from the outside of the carrier while rotating the carrier, wherein the method comprises applying several ring-shaped carriers arranged adjacent to each other, wherein each carrier is connected to a corresponding removing portion arranged and configured to remove the ferromagnetic material from the outside of the carrier, wherein the method comprises the step of applying a driving assembly that comprises one or more adjustment structures arranged and configured to increase the force with which the one or more rotatably mounted engagement members press towards the outside of the carriers.

Hereby, it is possible to provide a method by which automatic removal of ferromagnetic material can be carried out. Compared with the prior art manual methods, it is possible to save cost and provide an improved quality (lower concentration of the ferromagnetic material contained in the fluid).

Submerging the carrier into the fluid can be done by submerging a ferromagnetic material removing device according to the present disclosure into the fluid.

Since the carrier encases a plurality of permanent magnets arranged in an inner space of the carrier, the carrier is capable of collecting ferromagnetic material being attached to the outside surface of the carrier through magnetic attraction provided by the permanent magnets.

The step of releasing the ferromagnetic material from the outside of the carrier is carried out by using a removing portion that surrounds the upper most portion of the carrier.

In an embodiment, the ferromagnetic material placed at the outside of the carrier is released into a collecting structure that is arranged below the removing portion. Hereby, during rotation of the carrier, gravity will cause ferromagnetic material attached to the outside of the carrier to fall into the collecting structure (e.g. a drawer).

In an embodiment, the carrier is ring-shaped and has a circular cross-section. It is an advantage that the carrier is ring-shaped and rotatably mounted. The carrier is typically constructed as a centerless wheel.

In an embodiment, the rotation of the carrier is carried out by a driving assembly that comprises one or more rotatably mounted engagement members that are brought into engagement with the outside of the carrier. Hereby, the rotatably mounted engagement members can be used to provide a controlled and reliable rotation of the carrier.

In an embodiment, the mounted engagement members are shaped as pulleys and each carrier has a circular cross-section.

In an embodiment, the driving assembly comprises two spaced apart rotatably mounted engagement members.

In an embodiment, the rotation of the carrier is carried out by a driving assembly that comprises an electromagnet arranged and configured to generate an alternating magnetic field that causes the carrier to rotate. Hereby, it is possible to provide a contact free transfer of power and the mechanical wear of the carrier can be reduced.

It may be an advantage that the carrier comprises a magnet free zone because the magnet free zone will facilitate that process of releasing the ferromagnetic material attached to the outside of the carrier so that said ferromagnetic material can be removed from the removing portion.

BRIEF DESCRIPTION OF THE DRAWINGS

Devices and methods will become more fully understood from the detailed description given herein below. The accompanying drawings are given by way of illustration only, and thus, they are not limitative. In the accompanying drawings:

FIG. 7A shows a plate member of a ferromagnetic material removing device according to an embodiment;

FIG. 7B shows an end view of an engagement member of a ferromagnetic material removing device according to an embodiment;

FIG. 7C shows a cross-sectional view of the engagement member shown in FIG. 7B;

FIG. 8A shows a cross-sectional view of an engagement member that is brought into engagement with a carrier of a ferromagnetic material removing device according to an embodiment;

FIG. 8B shows a portion of a carrier of a ferromagnetic material removing device according to an embodiment; and FIG. 8C shows a portion of another carrier of a ferromagnetic material removing device according to an embodiment.

DETAILED DESCRIPTION

Figure 1A:
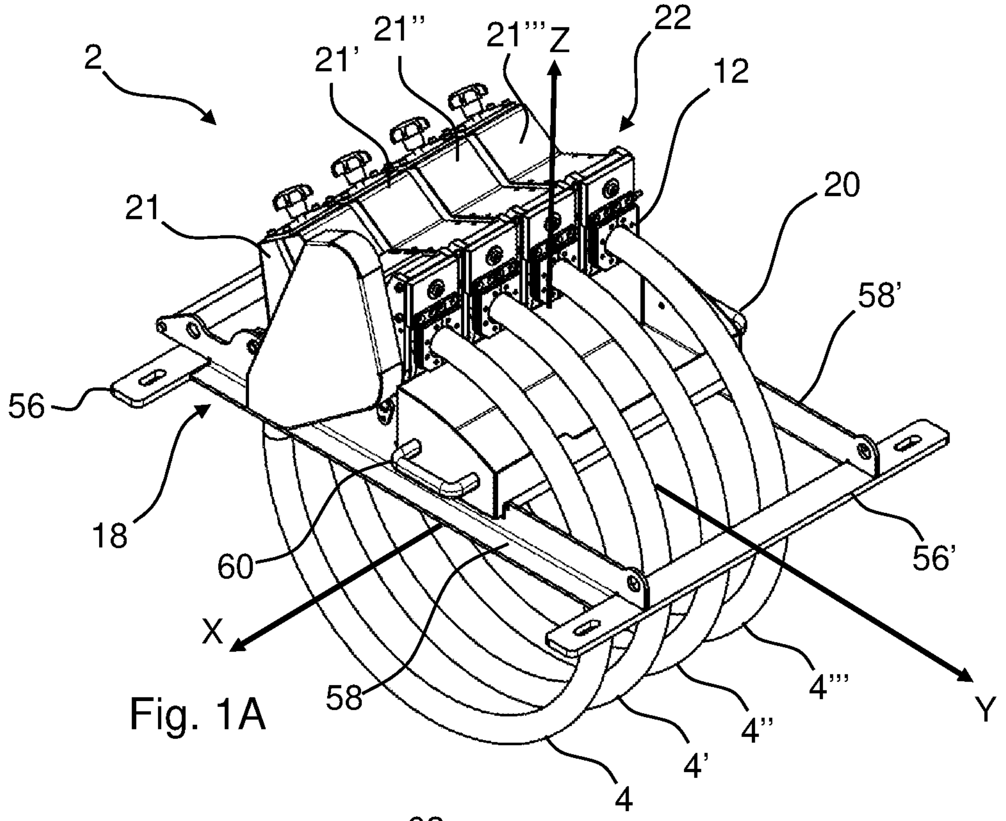
FIG. 1A shows a perspective, top view of a ferromagnetic material removing device according to an embodiment.

Referring now in detail to the drawings for the purpose of illustrating embodiments of the present devices and methods, a ferromagnetic material removing device acco 2 is illustrated in FIG. 1A.

FIG. 1A illustrates a perspective, top view of a ferromagnetic material removing device 2 according to an embodiment. The device 2 is designed to remove ferromagnetic material from a fluid (such as a water containing liquid) that contains ferromagnetic material. The device 2 comprises four modules that each comprise a carrier 4, 4', 4", 4'". Each carrier 4, 4', 4", 4'" encases a plurality of permanent magnets (see FIG. 4A, FIG. 4B, FIG. 4C, FIG. 4D, FIG. 5A, FIG. 5B, FIG. 8B and FIG. 8C. The permanent magnets are arranged in an inner space of the carrier.

The outside of each carrier 4, 4', 4", 4'" is configured to collect ferromagnetic material that is attracted by the magnets by magnetic attraction.

Each carrier 4, 4', 4", 4'" is ring-shaped and rotatably mounted.

Each carrier 4, 4', 4'", 4'" is connected to a corresponding removing portion 12 arranged and configured to remove the ferromagnetic material from the outside of the carrier 4, 4', 4", 4'".

The device 2 comprises a driving assembly 22 arranged to rotate the carriers 4, 4', 4", 4'". Accordingly, when operated, each carrier 4, 4', 4'", 4'" is driven by the driving structures of the driving assembly 22. Each carrier 4, 4', 4", 4'" is mounted in a corresponding driving member 21, 21', 21", 21'" of the driving assembly 22. The four driving members 21, 21', 21", 21'" are arranged side by side and constitute the driving assembly 22.

The device 2 comprises a frame 18 to which the driving assembly 22 is attached. The frame 18 comprises two parallel longitudinal bars 56, 56' and two lateral bars 58, 58' connecting the longitudinal bars 56, 56'.

The longitudinal bars 56, 56' extend parallel to the longitudinal axis X of the device 2. The lateral bars 58, 58' extend parallel to the lateral axis Y of the device 2. The frame 18 is configured to be mounted to structures that allow the lower half of each carrier 4, 4', 4", 4'" to be submerged in a liquid containing ferromagnetic material to be removed by the device 2. Accordingly, holes for attachment are provided in the longitudinal bars 56, 56' and in the lateral bars 58, 58'.

In another embodiment, the driving assembly 22 may comprise fewer or more driving members 21, 21', 21", 21'" arranged side by side and constituting the driving assembly 22. The number of driving members 21, 21', 21", 21'" required to, in a sufficient manner, remove ferromagnetic material from the liquid depends on the width of the structure (not shown) through which the liquid containing ferromagnetic material flows.

The device 2 comprises a drawer 20 arranged and configured to collect ferromagnetic material that is removed from the outside of the carriers 4, 4', 4", 4'" by the removing portions 12. The drawer 20 is detachably attached to the lateral bars 58, 58' of the frame 18. This is established by bringing slot structures in drawer 20 into engagement with corresponding plate structures of the lateral bars 58, 58'. Accordingly, the drawer 20 is restricted from moving along the longitudinal axis X of the device 2. The drawer 20 comprises a handle 60 attached to the end portion of the drawer 20.

The driving assembly 22 is detachably attached to the frame 18.

Figure 1B:
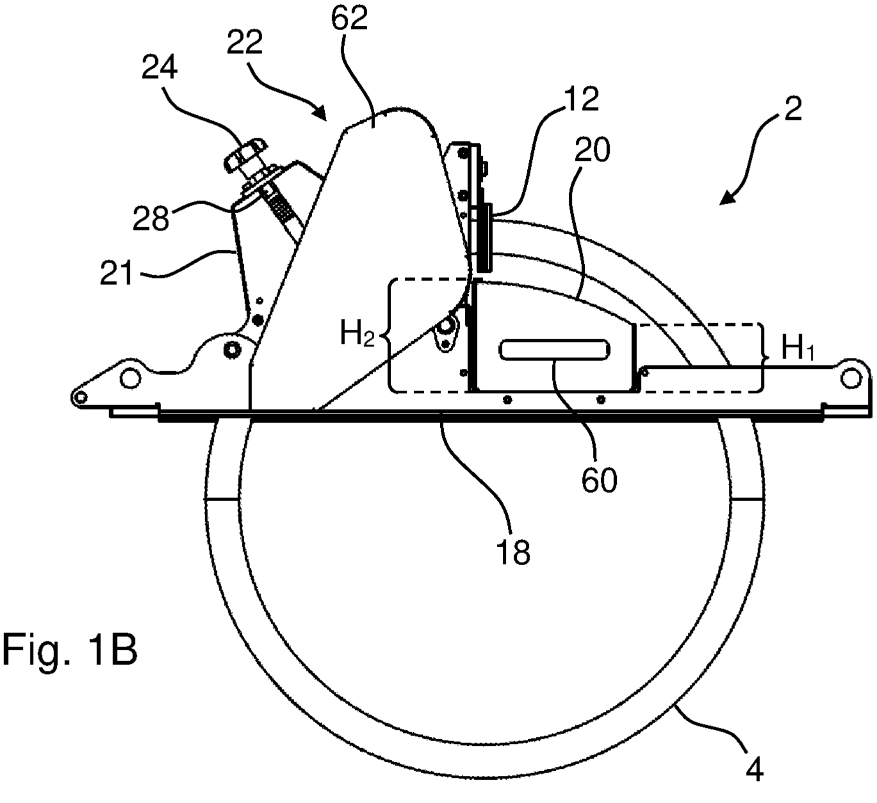
FIG. 1B shows a side view of the ferromagnetic material removing device shown in FIG. 1A.

FIG. 1B illustrates a side view of the ferromagnetic material removing device 2 shown in FIG. 1A. It can be seen that the carrier 4 comprises two halves that are joined to form a ring-shaped carrier 4. By having two halves it is possible to manufacture the carrier 4 by inserting permanent magnets into each of the two semicircular halves before joining said halves.

The drawer 20 comprises a front plate having an arched top portion extending between two side portions having different heights $H_1$, $H_2$. Hereby, the drawer 20 is adapted to fit the circular arched shape of the carrier 4.

A removing portion 12 is arranged and configured to remove the ferromagnetic material from the outside of the carrier 4. The removing portion 12 encircles a portion of the carrier 4 by having a geometry (a circular opening) that fits the cross-sectional area of the carrier 4. In practice, the circular opening of the removing portion 12 is slightly larger than the cross-sectional area of the carrier 4 to allow for tolerances of the carrier 4.

The removing portion 12 is arranged in the top section of the device 2 and the carrier 4 is arranged in such a manner that the removing portion 12 encircles the top portion of the carrier 4. Since the drawer 20 is arranged below the removing portion 12, gravity will cause ferromagnetic material attached to the outside of the carrier 4 to fall into the drawer 20.

In an embodiment, the carrier 4 comprises a magnet fee zone as shown in FIG. 4A, FIG. 4B, FIG. 4C and FIG. 5A. The magnet free zone will facilitate the process of releasing the ferromagnetic material attached to the outside of the carrier 4 so that said ferromagnetic material will fall into the drawer 20.

The device 2 comprises an end structure 62 arranged adjacent to the driving assembly 22.

The driving member 21 is provided with a slot 28. An adjustment structure 24 formed as a screw extends through the slot 28. The adjustment structure 24 comprises a threaded portion that engages with a corresponding threaded portion in the driving member 21. The adjustment structure 24 is arranged and configured to regulate the force with which an engagement member (see FIG. 8A) pushes against the carrier. Hereby, it is possible to ensure that the engagement member pushes against the carrier with a sufficiently large force even when the engagement member is subjected to wear during use.

In an embodiment, the adjustment structure 24 is spring loaded (a spring is arranged to provide a force towards the screw).

Figure 2A:
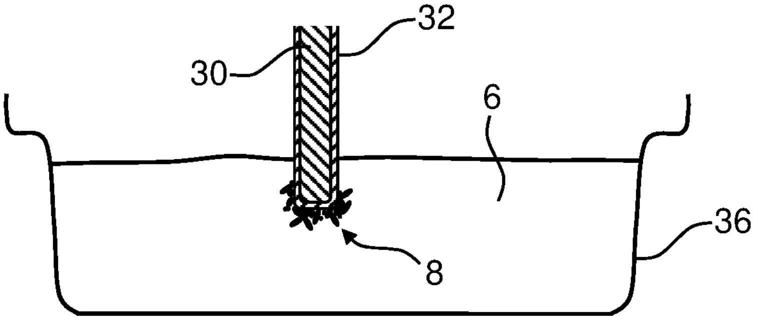
Fig. 2A PRIOR ART
FIG. 2A shows a prior art apparatus for removing ferromagnetic material from a liquid.

FIG. 2A illustrates a prior art apparatus for removing ferromagnetic material from a liquid. The prior art apparatus comprises a permanent magnet 30 slidably arranged in a sleeve 32.

In FIG. 2A, the sleeve 32 is partly submerged in a liquid 6 of a container 36. The liquid 6 contains ferromagnetic material 8. It can be seen that ferromagnetic material is attached to the outside surface of the sleeve 32 by magnetic attraction.

Figure 2B:
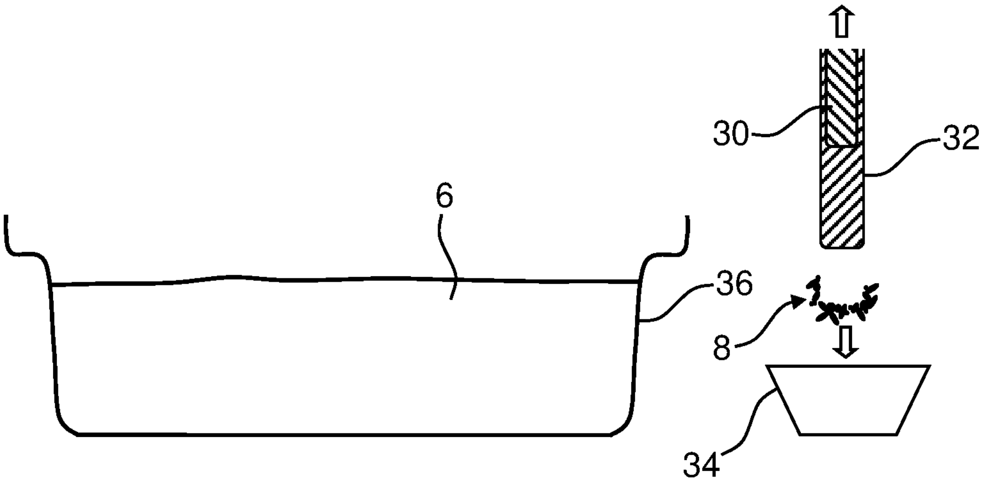
Fig. 2B PRIOR ART
FIG. 2B shows the apparatus shown in FIG. 2A in another configuration.

FIG. 2B illustrates the apparatus shown in FIG. 2A in another configuration, in which the permanent magnet 30 has been displaced axially along the longitudinal axis of the sleeve 32. Hereby, the permanent magnet 30 has been partly retracted from the sleeve 32. Consequently, the ferromagnetic material 8 no longer is attached to the outside surface of the sleeve 32. Therefore, the ferromagnetic material 8 falls into a tray 34 arranged below the sleeve 32.

The prior art apparatus is designed and configured to be manually operated. Therefore, it would be desirable to provide an alternative suitable for being operated automatically.

Figure 3A:
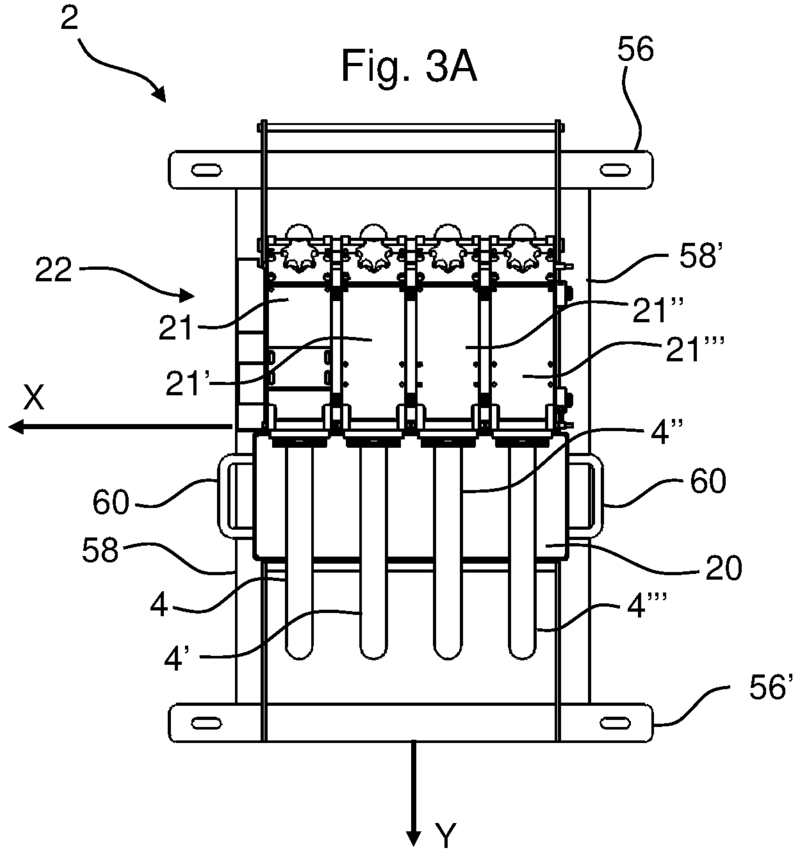
FIG. 3A shows a top view of the ferromagnetic material removing device shown in FIG. 1A.

FIG. 3A illustrates a top view of the ferromagnetic material removing device shown in FIG. 1A. It can be seen that the carriers 4, 4', 4'', 4''' are arranged parallel to each other and extend along the lateral axis Y. The drawer 20 has a handle 60 at each end.

Figure 3B:
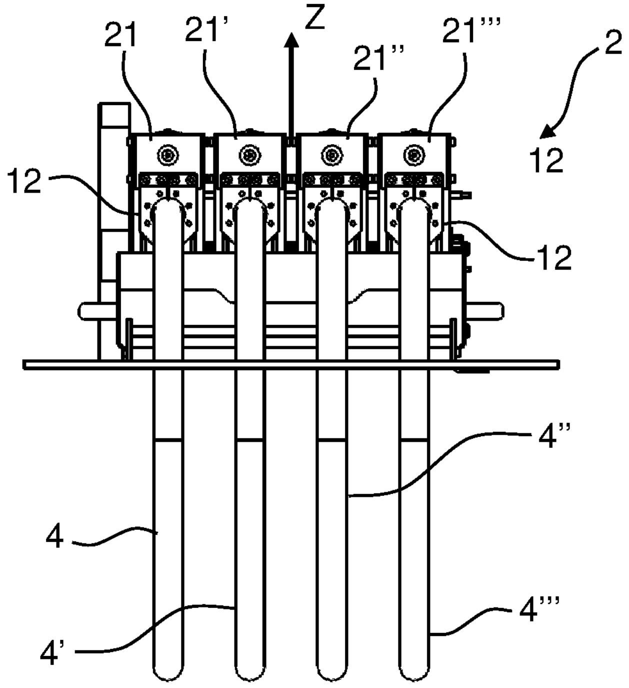
FIG. 3B shows a front view of the ferromagnetic material removing device shown in FIG. 1A and in FIG. 3A.

FIG. 3B illustrates a front view of the ferromagnetic material removing device shown in FIG. 1A and in FIG. 3A.

Figure 4A:
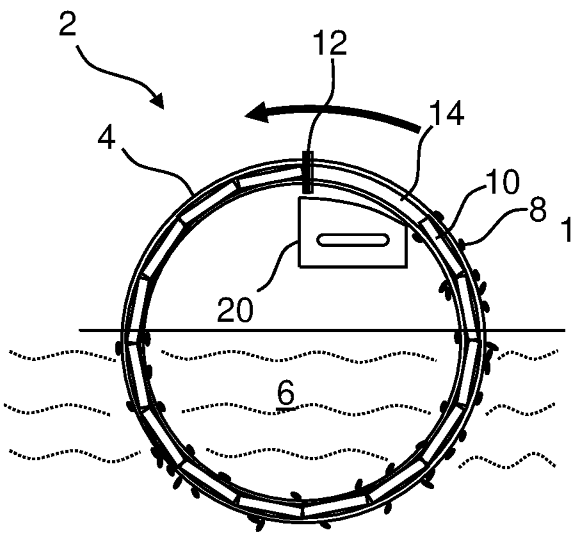
FIG. 4A shows a first schematic view of the working principle of a ferromagnetic material removing device according to an embodiment.
Figure 4B:
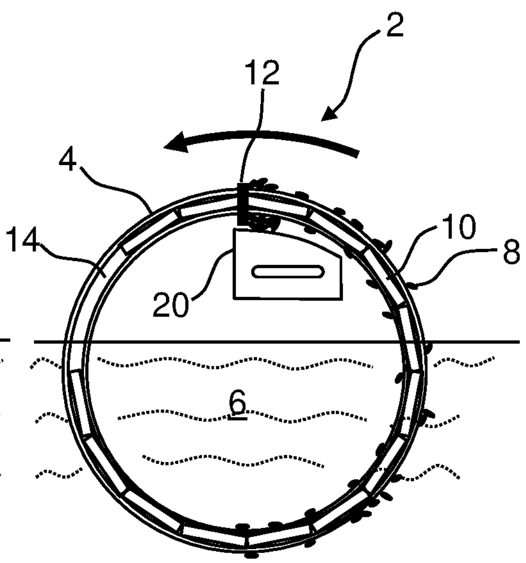
FIG. 4B shows a second schematic view of the working principle of the ferromagnetic material removing device shown in FIG. 4A.

FIG. 4A illustrates a first schematic view of the working principle of a ferromagnetic material removing device 2 according to an embodiment. FIG. 4B illustrates a second schematic view of the working principle of the ferromagnetic material removing device 2 shown in FIG. 4A.

The device 2 comprises a carrier 4 that encases a plurality of permanent magnets 10 arranged in an inner space 16 of the carrier 4. The lower half of the carrier 4 is submerged in a liquid 6 that contains ferromagnetic material 8. The outside of the carrier 4 has collected ferromagnetic material 8 through magnetic attraction. The carrier 4 is ring-shaped rotatably mounted in a removing portion 12 that is arranged and configured to remove the ferromagnetic material 8 from the outside of the carrier 4.

The device 2 comprises a driving assembly (not shown) arranged to rotate the carrier 4.

For illustrative purposes a cross-sectional view of the carrier 4 is shown in FIG. 4A and FIG. 4B. The carrier 4 comprises a magnet free zone 14, wherein no magnets are placed. In FIG. 4A, the magnet free zone 14 is approaching the removing portion 12 so that the free zone 14 is placed adjacent to the removing portion 12.

The carrier 4 is moved anticlockwise (indicated by the solid arrow). In FIG. 4B, the carrier 4 has been rotated about 90 degrees and the removing portion 12 sweeps or scrapes off the ferromagnetic material 8 from the outside of the carrier 4. Accordingly, the ferromagnetic material 8 is released from the outside surface of the carrier 4 and collected by the drawer 20.

Figure 4C:
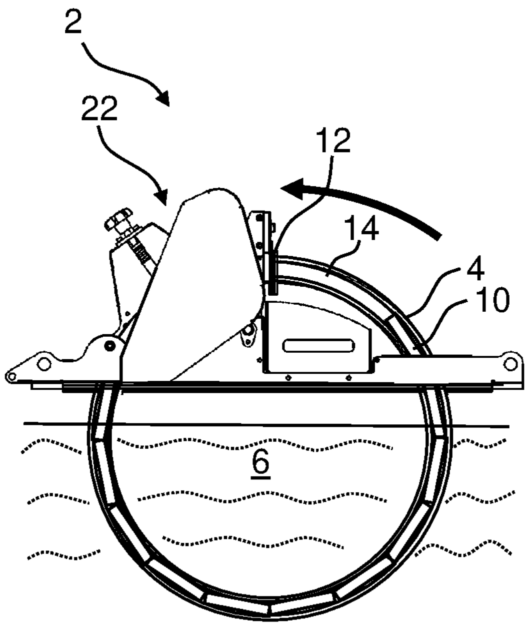
FIG. 4C shows a first schematic view of the working principle of a ferromagnetic material removing device according to an embodiment.
Figure 4D:
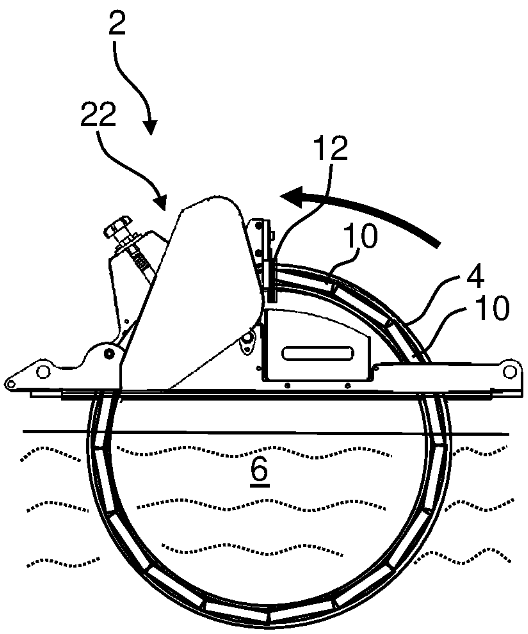
FIG. 4D shows a second schematic view of the working principle of the ferromagnetic material removing device shown in FIG. 4C.

FIG. 4C illustrates a first schematic view of the working principle of a ferromagnetic material removing device 2 according to an embodiment. FIG. 4D illustrates a second schematic view of the working principle of the ferromagnetic material removing device 2 shown in FIG. 4C. For illustrative purposes a cross-sectional view of the carrier 4 is shown in FIG. 4C and FIG. 4D so that the permanent magnets 10 encased by the carrier 4 are visible.

The permanent magnets 10 in FIG. 4A, FIG. 4B, FIG. 4C and FIG. 4D are relatively long. The length and shape of the permanent magnets 10 may however, be selected differently. FIG. 4C illustrates the carrier 4 as shown in FIG. 4A arranged in a driving assembly 22. Likewise, FIG. 4D illustrates the carrier 4 as shown in FIG. 4B arranged in a driving assembly 22.

Figure 5A:
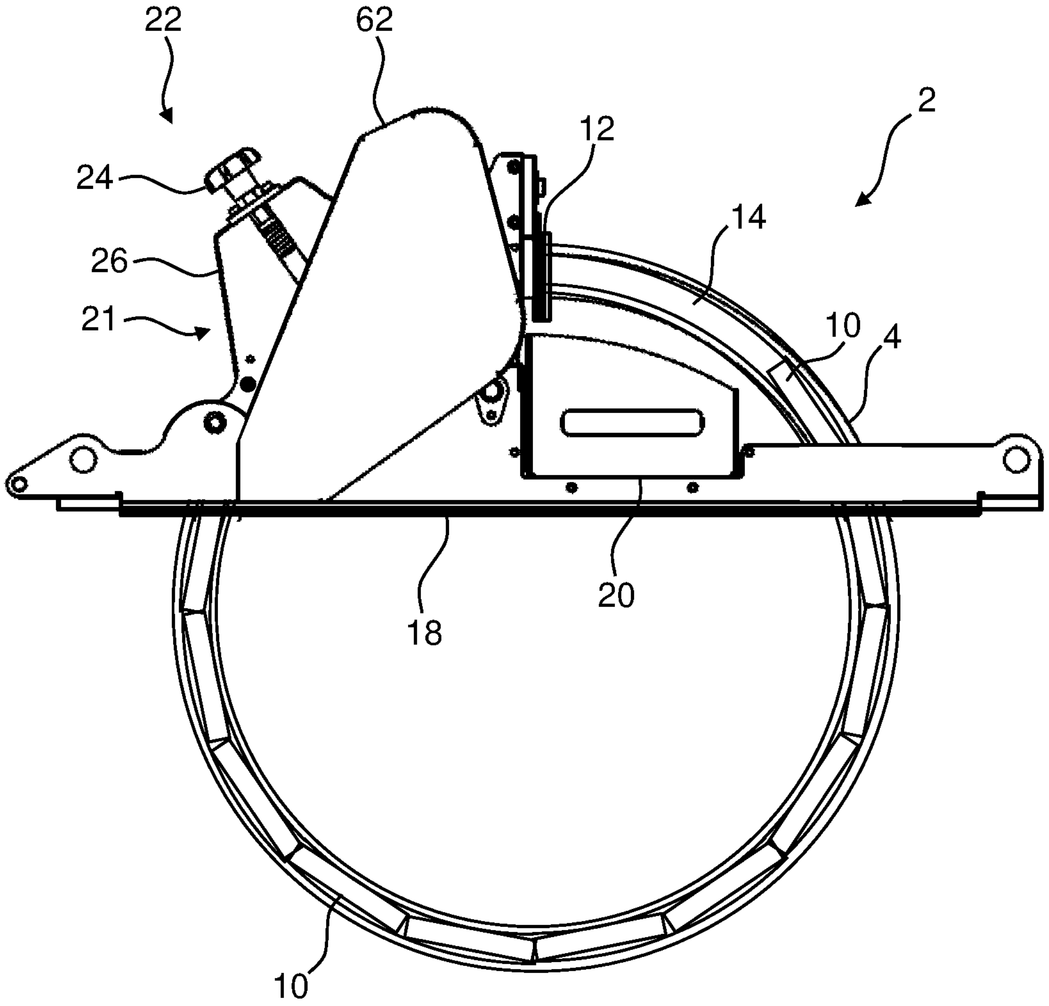
FIG. 5A shows a side view of a ferromagnetic material removing device according to an embodiment.

FIG. 5A illustrates a side view of a ferromagnetic material removing device 2 according to an embodiment. FIG. 5A basically corresponds to the device 2 shown in FIG. 4C. It can be seen that the driving assembly 22 comprises a driving member 21 that is covered by an end structure 62 arranged adjacent to the driving member 21. The driving member 21 comprises a housing 26 that is provided with a slot that has received an adjustment member 24. The adjustment member 24 comprises a threaded screw portion brought into engagement with a corresponding threaded portion of a threaded bore. The adjustment member 24 comprises a finger screw member arranged in the distal end of the adjustment member 24.

Figure 5B:
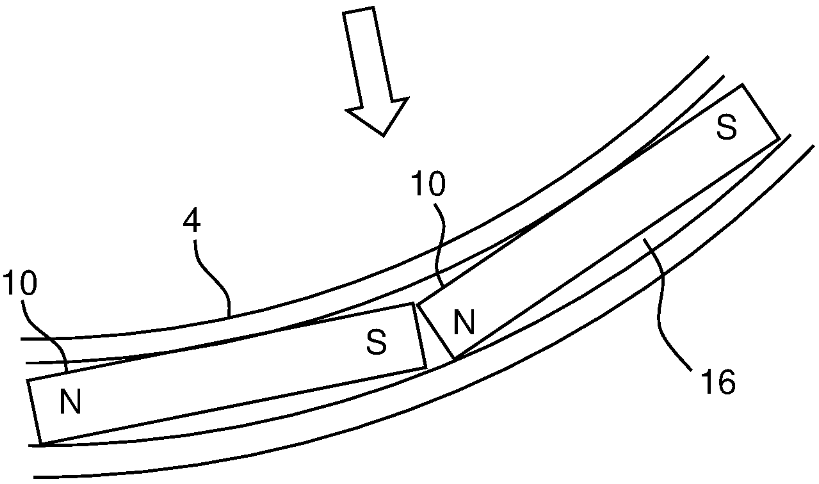
FIG. 5B shows a close-up view of a portion of the carrier of the ferromagnetic material removing device shown in FIG. 5A.

FIG. 5B illustrates a close-up view of a portion of the carrier 4 of the ferromagnetic material removing device 2 shown in FIG. 5A. For illustrative purposes a cross-sectional view of the carrier 4 is shown in FIG. 5A and FIG. 5B. Accordingly, the permanent magnets 10 encased by the carrier 4 are visible. It can be seen that the magnets 10 have a north pole N and a south pole S. The magnets are arranged with alternating polarity so that adjacent magnets have poles of different polarity arranged adjacent to each other.

It can be seen that the permanent magnets 10 are arranged in an inner space 16 of the carrier 4.

Figure 6A:
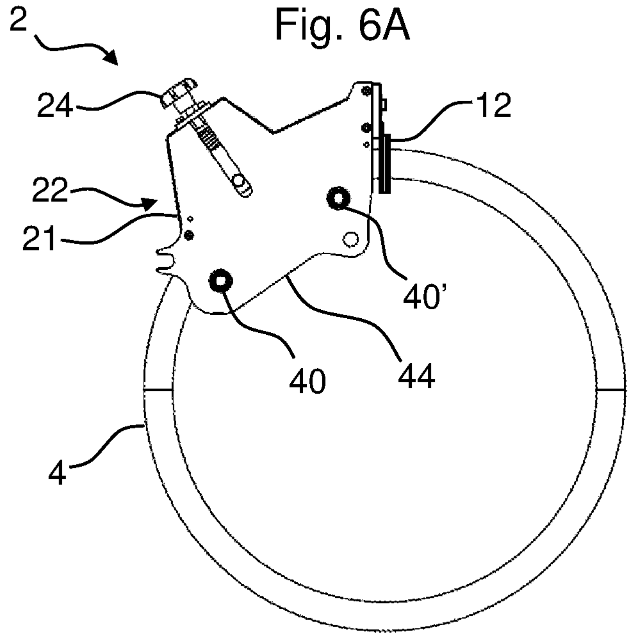
FIG. 6A shows a side view of a ferromagnetic material removing device according to an embodiment.
Figure 6B:
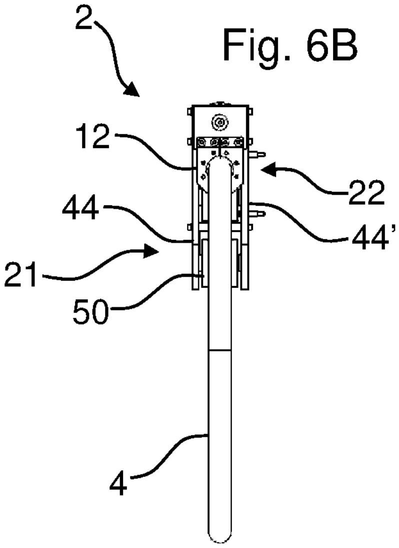
FIG. 6B shows a front view of the ferromagnetic material removing device shown in FIG. 6A.
Figure 6C:
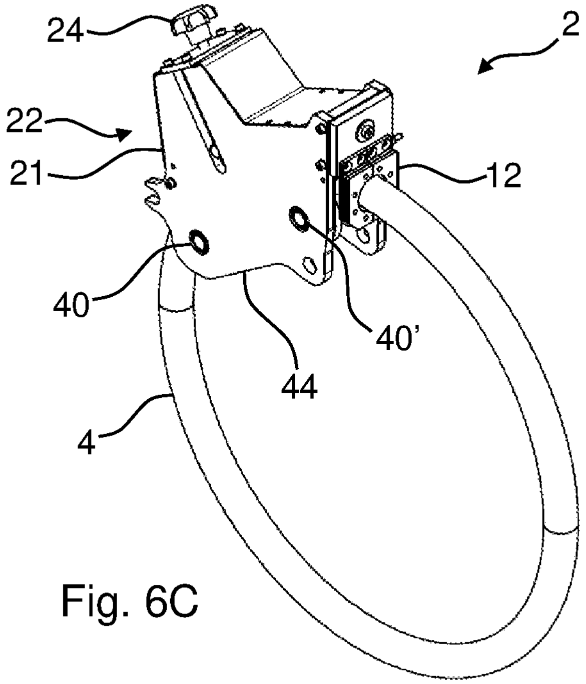
FIG. 6C shows a perspective view of the ferromagnetic material removing device shown in FIG. 6A.

FIG. 6A illustrates a side view of a ferromagnetic material removing device 2 according to an embodiment. FIG. 6B illustrates a front view of the ferromagnetic material removing device 2 shown in FIG. 6A. FIG. 6C illustrates a perspective view of the ferromagnetic material removing device 2 shown in FIG. 6A. The device 2 comprises only a single module (a carrier 4 and a corresponding driving assembly 22). The carrier 4 comprises two halves that are attached to each other to constitute a ring. The carrier 4 is rotatably mounted on the driving assembly 22 by two engagement members 50 corresponding to the one shown in FIG. 7B, FIG. 7C and FIG. 8A.

In FIG. 6B one of the engagement members 50 is visible. It can be seen that the engagement member 50 is rotatably attached to two spaced apart plate members 44, 44' of the driving assembly 22. In FIG. 6A and FIG. 6C it can be seen that a first end member 40 and a second end member 40' are used to mount corresponding shafts of the engagement members 50 to the plate members 44, 44' of the driving assembly 22. The engagement member 50 may be driven by an external motor (not shown). In an embodiment, the engagement member 50 is driven by an electric motor. In an embodiment, the ferromagnetic material removing device 2 comprises several carriers 4, wherein each carrier 4 is driven by a single motor.

The driving assembly 22 comprises a single driving member 21 provided with a slot and an adjustment structure 24 formed as a screw that extends through the slot. The adjustment structure 24 comprises a threaded portion that engages with a corresponding threaded portion in the driving member 21. Hereby, the adjustment structure 24 can be used to regulate the force with which an engagement member pushes against the carrier 4. Accordingly, it is possible to ensure that the engagement member pushes against the carrier with a sufficiently large force to drive the carrier.

FIG. 7A illustrates a plate member 44 of a ferromagnetic material removing device 2 according to an embodiment. The plate member 44 corresponds to the one shown in FIG. 6A, FIG. 6B and FIG. 6C. The plate member 44 comprises two mounting bores 46, 46' arranged to receive the first end member 40 and the second end member 40' shown in FIG. 6A and FIG. 6C. The plate member 44 comprises an elongated slot 28 and a bore 48.

FIG. 7B illustrates an end view of an engagement member 50 of a ferromagnetic material removing device according to an embodiment. FIG. 7C illustrates a cross-sectional view of the engagement member 50 shown in FIG. 7B (the section line is indicated in FIG. 7B). The engagement member 50 is formed as a pulley and comprises a concave engagement surface 52 configured to be brought into engagement with a carrier having a portion that has a semi-circular cross section. This means that the engagement surface 52 is configured to be brought into engagement with a carrier having a circular cross section such as the carrier shown in FIG. 8A.

The engagement member 50 is provided with a through bore having a spline profile. The engagement member 50 comprises cylindrical holes 42 provided in each end section.

FIG. 8A illustrates a cross-sectional view of an engagement member 50 that is brought into engagement with a carrier 4 of a ferromagnetic material removing device according to an embodiment. The engagement member 50 corresponds to the one shown in FIG. 7B and FIG. 7C. The carrier 4 has a circular cross-section and is brought into engaging contact with the engagement surface 52 of the engagement member 50. A shaft 38 extends through the engagement member 50. The shaft 38 may be connected to a motor that is used to drive the one or more driving members of the ferromagnetic material removing device.

In an embodiment, a single shaft 38 extends through all engagement members 50 of the ferromagnetic material removing device. Hereby, it is possible to drive all engagement members 50 by a single motor.

FIG. 8B illustrates a schematic, cross-sectional view portion of a carrier 4 of a ferromagnetic material removing device according to an embodiment. The carrier 4 comprises a plurality of permanent magnets 10 arranged next to each other. The carrier 4 is ring-shaped and comprises a circular cross-section. The permanent magnets 10, however, are cylindrical with a circular cross-section. Accordingly, even when adjacent permanent magnets 10 are arranged as close as possible to each other, there will be a gap between adjacent end sides of adjacent permanent magnets 10. The north pole N and the south pole S of the permanent magnets 10 are indicated.

FIG. 8C illustrates a portion of another carrier 4 of a ferromagnetic material removing device according to an embodiment. The carrier 4 comprises a plurality of permanent magnets 10 arranged next to each other. The carrier 4 is ring-shaped and comprises a circular cross-section. The permanent magnets 10, are shaped to fit the inside geometry of the carrier 4. Accordingly, it is possible to reduce or even eliminate the gap between adjacent end sides of adjacent permanent magnets 10. The north pole N and the south pole S of the permanent magnets 10 are indicated.

LIST OF REFERENCE NUMERALS

2 Ferromagnetic material removing device
4, 4', 4'', 4''' Carrier
6 Fluid
8 Ferromagnetic material
10 Permanent magnet
12 Removing portion
14 Magnet free zone
16 Inner space
18 Frame
20 Drawer
21, 21' Driving member
21'', 21''' Driving member
22 Driving assembly
24 Adjustment structure (e.g. screw)
26 Housing
28 Slot
30 Permanent magnet
32 Sleeve
34 Tray
36 Container
38 Shaft
40, 40' End member
42 Hole
44, 44' Plate member
46, 46' Mounting bore
48 Bore
50 Engagement member
52 Engagement surface
54 Spline profile
56, 56' Longitudinal bar
58, 58' Lateral bar
60 Handle
62 End structure
N North pole
S South pole
X Longitudinal axis
Y Lateral axis
Z Transversal axis
$H_1$, $H_2$ Height

What is claimed is:

1. A ferromagnetic material removing device for removing ferromagnetic material from a fluid containing ferromagnetic material, wherein the device comprises:

at least one carrier encasing a plurality of permanent magnets arranged in an inner space of the carrier, wherein an outside of the carrier is configured to collect ferromagnetic material that is attracted by the permanent magnets, wherein the carrier is rotatably mounted;

a removing portion arranged and configured to remove the ferromagnetic material from the outside of the carrier; and a driving assembly arranged to rotate the carrier, the driving assembly comprising one or more rotatably mounted engagement members brought into engagement with the outside of the carrier;

wherein the carrier is ring-shaped and the carrier comprises a magnet free zone.

2. The device according to claim 1, wherein the magnet free zone extends 25 degrees or more.

3. The device according to claim 1, wherein the device comprises several carriers arranged adjacent to each other.

4. The device according to claim 1, wherein the driving assembly comprises one or more adjustment structures arranged and configured to increase a force with which the one or more rotatably mounted engagement members press towards the outside of the one or more carriers.

5. The device according to claim 1, wherein the driving assembly comprises two spaced apart rotatably mounted engagement members.

6. The device according to claim 5, wherein the driving assembly comprises one or more adjustment structures arranged and configured to increase a force with which the one or more rotatably mounted engagement members press towards the outside of the one or more carriers.

7. The device according to claim 1, wherein the driving assembly comprises an electromagnet arranged and configured to generate an alternating magnetic field that causes the carrier to rotate.

8. The device according to claim 1, wherein the device comprises a drawer arranged and configured to collect ferromagnetic material removed from the outside of the carrier by the removing portion.

9. A method for removing ferromagnetic material from a fluid containing ferromagnetic material using a ferromagnetic material removing device, wherein the method comprises the following steps:

submerging a carrier into the fluid, wherein said carrier encases a plurality of permanent magnets arranged in an inner space of the carrier, wherein an outside of the carrier is configured to collect ferromagnetic material that is attracted by the magnets; and releasing the ferromagnetic material from the outside of the carrier, wherein the carrier is rotatably mounted and a removing portion is arranged and configured to remove the ferromagnetic material from the outside of the carrier while rotating the carrier;

wherein the rotation of the carrier is carried out by a driving assembly that comprises one or more rotatably mounted engagement members that are brought into engagement with the outside of the carrier;

wherein the carrier is ring-shaped and the carrier comprises a magnet free zone.

10. The method according to claim 9, wherein the magnet free zone extends 25 degrees or more.

11. The method according to claim 9, wherein the device comprises several carriers arranged adjacent to each other.

12. Method according to claim 9, wherein the ferromagnetic material from the outside of the carrier is released into a collecting structure that is arranged below the removing portion.

13. The method according to claim 9, wherein the carrier is ring-shaped and has a circular cross-section.

14. The method according to claim 9, wherein the rotation of the carrier is carried out by a driving assembly that comprises an electromagnet arranged and configured to generate an alternating magnetic field that causes the carrier to rotate.

15. The method according to claim 9, wherein the rotation of the carrier is carried out by a driving assembly that comprises an electromagnet arranged and configured to generate an alternating magnetic field that causes the carrier to rotate.

* * * * *